US007575174B2

(12) United States Patent
Gordon

(10) Patent No.: US 7,575,174 B2
(45) Date of Patent: Aug. 18, 2009

(54) LABEL AND METHOD FOR ATTACHING A LABEL TO AN ARTICLE

(76) Inventor: Michael A. Gordon, 30 Ellen Ct., Ocean, NJ (US) 07712

( * ) Notice: Subject to any disclaimer, the term of this patent is extended or adjusted under 35 U.S.C. 154(b) by 347 days.

(21) Appl. No.: 11/589,786

(22) Filed: Oct. 31, 2006

(65) Prior Publication Data

US 2008/0116284 A1 May 22, 2008

(51) Int. Cl.
*G06K 19/00* (2006.01)

(52) U.S. Cl. .......................... 235/487; 40/359; 283/81; D9/550

(58) Field of Classification Search ................. 235/487, 235/489, 492; 40/299.01, 359; 283/36, 81; D9/550

See application file for complete search history.

(56) References Cited

U.S. PATENT DOCUMENTS

| | | | | |
|---|---|---|---|---|
| 4,201,403 | A * | 5/1980 | Turner | 283/74 |
| 4,520,055 | A | 5/1985 | Jeter | |
| 4,905,393 | A | 3/1990 | Laurie | |
| 4,972,615 | A * | 11/1990 | Grant | 40/641 |
| 5,462,783 | A | 10/1995 | Esselmann | |
| 5,989,667 | A | 11/1999 | Tayebi | |
| 6,089,777 | A | 7/2000 | Wong | |
| 6,364,366 | B1 | 4/2002 | Schwartz | |
| 6,385,860 | B1 | 5/2002 | MacWilliams et al. | |
| 6,594,933 | B2 | 7/2003 | Attia et al. | |
| 2003/0017294 | A1 | 1/2003 | MacDonell et al. | |
| 2003/0066219 | A1 * | 4/2003 | Palumbo | 40/359 |
| 2004/0001930 | A1 | 1/2004 | Roth et al. | |
| 2004/0091659 | A1 | 5/2004 | Banks et al. | |

OTHER PUBLICATIONS

Avery Dennison Corporation, "Printable Self-Adhesive Tabs," Package#16283, Jan. 1, 2002.

Avery Dennison Corporation, "Big Tab Two Pocket Reference Dividers" Package#11906, Jan. 1, 2002.

[http://www.tabbies.com],"About Tabbies," Jun. 31, 2005.

* cited by examiner

*Primary Examiner*—Seung H Lee
(74) *Attorney, Agent, or Firm*—Oliff & Berridge, PLC

(57) ABSTRACT

A label includes a protruding part that may display information from both sides when attached to an article. Information can be added to the front surface of the label before attaching to an article without rotating the information on one portion of the label or the label 180 degrees or otherwise changing the orientation of the information. The label may include two sections, each section including one of a top portion and a bottom portion. The top portions may be connected to each other at a fold line. The bottom portions may be separated by a separation. The first section and/or the second section may include identification information.

20 Claims, 8 Drawing Sheets

LABEL AND METHOD FOR ATTACHING A LABEL TO AN ARTICLE

BACKGROUND

This disclosure relates to a label and a method of attaching a label to an article, for example, a document, folder, divider, envelope, card, a cylindrical object such as a tube, cable or wire, a retail item or the like.

An individual label may be attached to an article such as a sheet. Alternatively, multiple labels may be attached to a single article.

A label may be used to identify an article by including identification information. The label may include identification information on the front surface of the label and adhesive on the back surface. The label may be attached to an article so that a portion of the label including the identification information protrudes from the article. The information on the label may then be visible when, for example, the article is stored in a cabinet, or on a shelf. It is also sometimes advantageous to have a two-sided label with information on both sides to provide easy identification of the article from both sides.

The identification information may be added to any label, for example, by a printing device. The printing device may be, for example, a computer-controlled printer, a printing press, a label-making device, a typewriter, a rubber stamp, or the like. Alternatively, the identification information may be added by another label, by hand writing, or the like. For a two-sided label, it is desirable for the identification information to have the same orientation on both sides of the label after it is attached to the article. To position the identification information on one surface of a label so that it has the same orientation on both sides of a two-sided label after the label is attached to an article, computer-controlled printer software, such as, for example, word processing, spreadsheet or special label programs, may require the use of special software routines. Printing presses may also require special printing plates.

Such labels, having the identification information applied to one surface of the label before being attached to an article, and after being attached to an article forming a two-sided label with a protruding part, with the identification information having the same orientation on both sides of the label, are known. For example, with reference to FIG. 1, in a related art, a label includes two areas on the same surface on which to include information. One of the areas for the information differs 180 degrees from the second area for the information. When the label is folded about an axis, the areas including the information oppose each other, i.e., each area faces in opposite directions so that the label becomes a two-sided label with information visible on both sides. More specifically, the label 100 includes a first section 110 and a second section 130. The first section 110 and the second section 130 include a top portion 112 and a top portion 132, respectively. Information is applied to the top portion 112 and the top portion 132 such that the information applied to the top portion 112 is rotated 180 degrees from the information applied to the top portion 132. Label 100 is folded about a fold line 170 so that the top portion 112 of section 110 and the top portion 132 of section 130 oppose each other forming the protruding part of the label and becoming opposite sides of a two-sided label. The back surfaces of portions 112 and 132 now face each other and will stick to each other if coated with an adhesive. The bottom portion of sections 110 and 130 are used to adhere the label to an article.

SUMMARY

Exemplary embodiments of this disclosure may provide a label that when attached to an article becomes a two-sided label with a protruding part, and a method of attaching a label to an article. That is, information applied to one surface of the label before being attached to an article will appear on both sides of the protruding part after the label is attached to an article. Thus, it is not required to rotate the information that appears on one side of the protruding part 180 degrees from the information that appears on the other side of the protruding part. In contrast, in the related art, the information that will appear on one side of the protruding part of a label has to be rotated 180 degrees from the information that appears on the other side of the protruding part of the label. That is, in the related art, to apply information to one surface of a label that becomes a two-sided label when attached to an article, special computer software programs or special print plates may be used to format the information correctly. The label maker (i.e., the individual who creates the label by adding the identification information) must understand how to produce the special print plates or how to use the computer programs so that the information is properly formatted on the label. These special computer programs may require special handling. Exemplary embodiments of this disclosure may avoid the need for such special handling.

Further, computer programs may not automatically format the information so that the information is properly displayed on both sides of the label when attached to an article. In such a case, the label maker may have to manually format the information on each portion of the label so that the information printed on one portion of the label has an opposing orientation to the information printed on the other portion of the label. That is, the information printed on one portion of the label is rotated 180 degrees from the information printed on the other portion of the label. In other words, the label maker may have to rotate the information by using different features of software programs or special software programs to properly format the information on the label so that the orientation of the information on the first portion and the second portion oppose each other.

This process requires the label maker to supply special print plates and/or learn how to use the special computer programs. The label described in this disclosure eliminates the need to rotate information and can easily be attached to an article.

Exemplary embodiments of this disclosure provide a label that when attached to an article has a part that protrudes from the article and forms the two-sided portion of the label. Information applied to one surface of the label will appear on both the front and back sides of the protruding part when the label is attached to an article. No portion of the information has to be rotated 180 degrees.

Exemplary embodiments of a label according to this disclosure may include a fold line that divides the label into two sections, a first and a second section, and a guideline that is perpendicular to the fold line and divides each section into top and bottom portions. The guideline and fold line may not be visible lines on the label. The two top portions remain connected to each other at the fold line. The two bottom portions are physically separated from each other by a separation along the fold line.

Exemplary embodiments of a method of attaching such a label to an article may include sliding the article through the separation, attaching one bottom section to the article, folding the label at the fold line so that the top sections oppose each other, forming the protruding part of the label, and then attaching the second bottom section to the article. Another method of attaching such a label to an article may include: folding the label at a fold line so the top sections oppose each other, sliding the article between the two bottom sections of the label and attaching them to the article. Other variations of these methods may be used depending on label material, adhesive and the article.

Because the information applied to the second section of the label is not rotated 180 degrees from the information applied to the first section, no special software or special handling is necessary to add the information to a label. As a result, existing software such as label software and other means of putting information on a label including, for example, computer-controlled printers, printing presses and label printers, may be used to apply information to such a label. Thus, no special label software or materials are required.

Any commonly known method of adding information to a label may be used, and any material commonly used for labels may be used. For example, computer programs, such as word processing and spreadsheet programs, may be used along with existing computer printers to apply information to a label according to exemplary embodiments. Label programs may also be used with known label printing machinery such as, for example, label makers and hand held label printers to apply information to the label. Of course, the information can alternatively be added by hand using a pencil, pen, marker or the like.

The label may be made from any known label material. The labels may also be produced on any existing label making machinery by modifying the die to produce the separation. Accordingly, no special label material is required. As a result, the label described in this disclosure represents a step forward in the area of double-sided labels.

These and other objects, advantages and/or features are described in or are apparent from the following detailed description.

BRIEF DESCRIPTION OF THE DRAWINGS

Various exemplary details are described herein, with reference to the following figures, wherein.

DETAILED DESCRIPTION OF EMBODIMENTS

Figure 1:
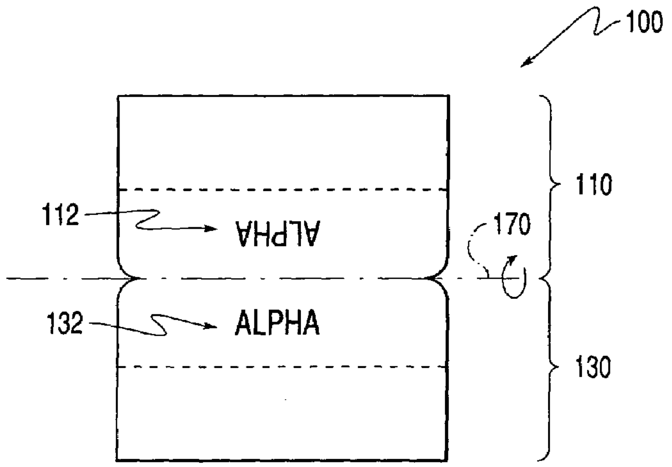
FIG. 1 RELATED ART
FIG. 1 shows an example of a related art.
Figure 2:
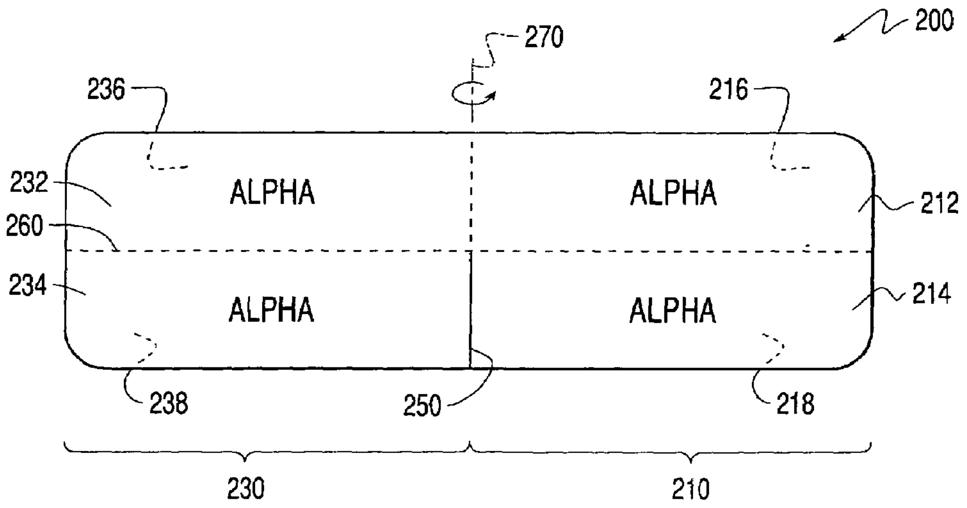
FIG. 2 shows a label according to a first exemplary embodiment.

FIG. 2 illustrates a label 200 according to a first exemplary embodiment. The label 200 may include a first section 210, a second section 230 and a separation 250, shown as a line in FIG. 2. The first section 210 may include a top portion 212 and a bottom portion 214. The second section 230 may include a top portion 232 and a bottom portion 234. The label 200 may also include a guideline 260. The guideline 260 shown in FIG. 2 as a dashed line delineates the top and bottom portions, and may not be a visible line. The guideline 260 may also be visible to guide the attachment of the label to an article. The top portion 212 is connected to the top portion 232 at a fold line 270. Back surfaces 218 and 238 of the bottom portions 214 and 234, respectively, may be provided with an adhesive to attach the label to an article. Back surfaces 216 and 236 of the top portions 212 and 232, respectively, may be provided with an adhesive to attach the top portions to each other, if desired. The separation 250 separates the bottom portion 214 and the bottom portion 234. The separation may be substantially the height of the bottom portion 214 of the first section 210 and/or the bottom portion 234 of the second section 230. The separation 250 may be a cut, a slit, a notch, such as a triangular, a rectangular or an irregular shaped notch, a tear, a torn perforation or any other type of separation. For example, the separation 250 shown in FIG. 2 is a slit.

Information may be applied to the front surface of the label 200. Information may be provided on any combination of the top portions, 212 and 232, and the bottom portions, 214 and 234. Information may be applied to the back surface, if desired. However, information applied to the back surface may not be visible after the label is attached to an article. As shown in FIG. 2, information may be applied in the same orientation on any portion of the front of the label prior to (and after) folding the label.

If the guideline 260 is visible, the guideline 260 may be used to align the bottom portions 214 and 234 of the first section 210 and the second section 230, respectively, with an edge of an article prior to attaching. The guideline 260 may be aligned with an edge of an article so that the top portions 212 and 232 do not attach to the article when the label is folded, but instead protrude from the article and can be attached to each other.

Figure 3:
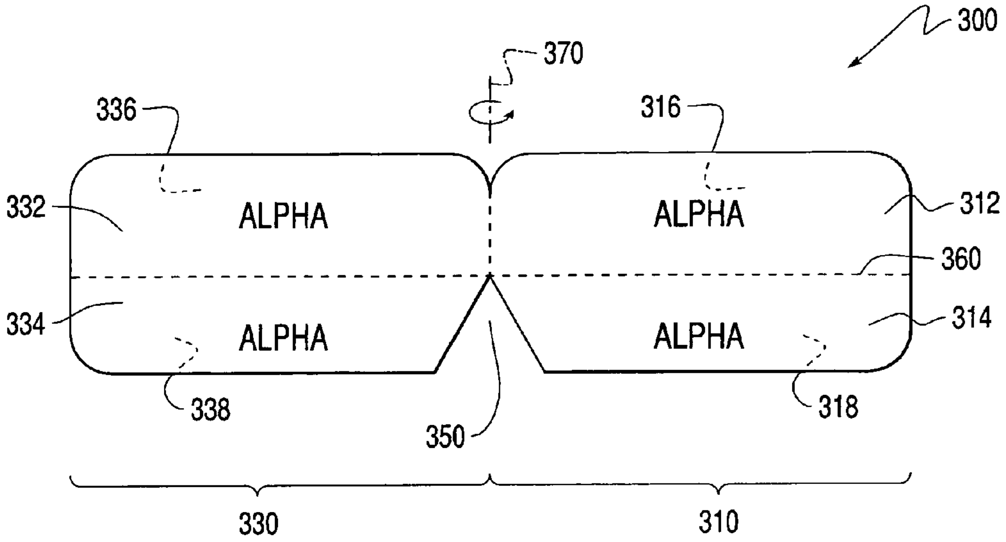
FIG. 3 shows a label according to a modification of the first exemplary embodiment.

FIG. 3 illustrates a label 300, which is an example of a modification of a label according to the first embodiment. The label 300 may be substantially similar to label 200 shown in FIG. 2, but for the separation 350. For example, the separation 350 may be a triangular shaped notch. The label 300 may include a first section 310 and a second section 330 and a guideline 360. The first section 310 may include a top portion 312 and a bottom portion 314. The second section 330 may include a top portion 332 and a bottom portion 334. The guideline 360 shown in FIG. 3 as a dashed line delineates the top and bottom portions, and may not be a visible line. The guideline 360 may also be visible to guide the attachment of the label to an article. The top portion 312 is connected to the top portion 332 at a fold line 370. Back surfaces 318 and 338 of the bottom portions 314 and 334, respectively, may be provided with an adhesive to attach the label to an article. Back surfaces 316 and 336 of the top portions 312 and 332, respectively, may be provided with an adhesive to attach the top portions to each other, if desired. The separation 350 separates the bottom portion 314 and the bottom portion 334. The separation may be substantially the height of the bottom portion 314 of the first section 310 and/or the bottom portion 334 of the second section 330.

Information may be applied to the front surface of the label 300. Information may be applied to any combination of the top portions, 312 and 332, and the bottom portions, 314 and 334. Information may be applied to the back surface, if desired. However, information applied to the back surface may not be visible after the label is attached to an article. As shown in FIG. 3, information may be applied in the same orientation on any portion of the front of the label prior to (and after) folding the label.

Figure 4:
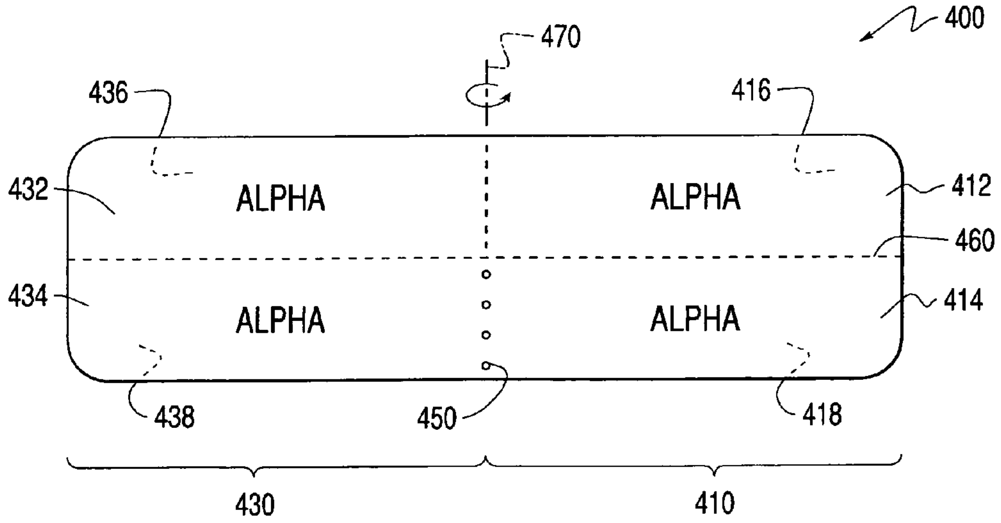
FIG. 4 shows a label according to another modification of the first exemplary embodiment.

FIG. 4 illustrates a label 400, which is an example of a modification of a label according to the first embodiment. The label 400 may be substantially similar to label 200 shown in FIG. 2, but for the separation 450. For example, the separation 450 may be a perforation, which is shown as a dotted line. Before attaching the label 400 to an article, the perforation is cut or torn.

The label 400 may also include a first section 410, a second section 430 and a guideline 460. The first section 410 may include a top portion 412 and a bottom portion 414. The second section 430 may include a top portion 432 and a bottom portion 434. The guideline 460 shown in FIG. 4 as a dashed line delineates the top and bottom portions, and may not be a visible line. The guideline 460 may also be visible to guide the attachment of the label to an article. The top portion 412 is connected to the top portion 432 at a fold line 470. Back surfaces 418 and 438 of the bottom portions 414 and 434, respectively, may be provided with an adhesive to attach the label to an article. Back surfaces 416 and 436 of the top portions 412 and 432, respectively, may be provided with an adhesive to attach the top portions to each other, if desired. The separation 450 separates the bottom portion 414 and the bottom portion 434. The separation 450 may be substantially the height of the bottom portion 414 of the first section 410 and/or the bottom portion 434 of the second section 430.

Information may be applied to the front surface of the label 400. Information may be applied to any combination of top portions, 412 and 432, and the bottom portions, 414 and 434. Information may be applied to the back surface, if desired. However, information applied to the back surface may not be visible after the label is attached to an article. As shown in FIG. 4, information may be applied in the same orientation on any portion of the front of the label prior to (and after) folding the label.

Figure 5:
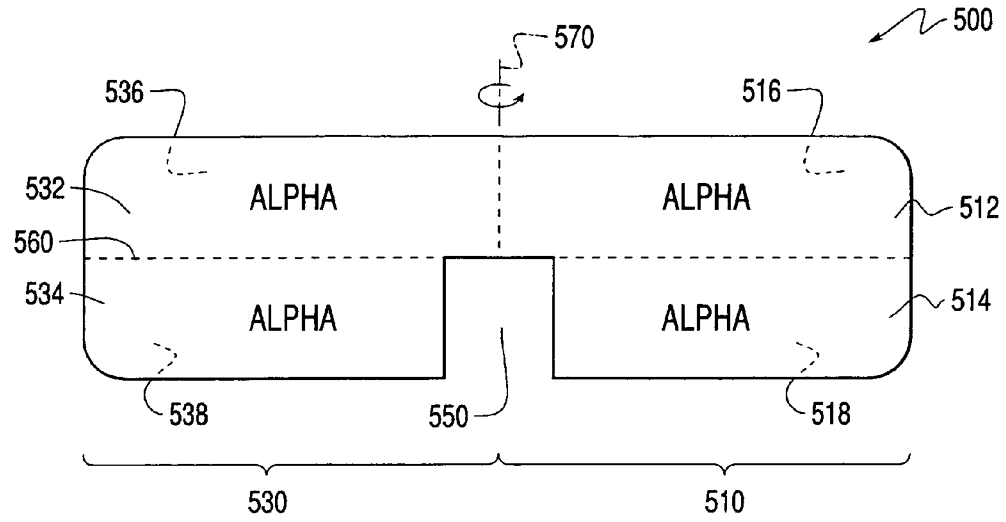
FIG. 5 shows a label according to another modification of the first exemplary embodiment.

FIG. 5 illustrates a label 500, which is an example of a modification of a label according to the first embodiment. The label 500 may be substantially similar to label 200 shown in FIG. 2, but for the separation 550. For example, the separation 550 may be a rectangular shaped notch.

The label 500 may include a first section 510, a second section 530 and a guideline 560. The first section 510 may include a top portion 512 and a bottom portion 514. The second section 530 may include a top portion 532 and a bottom portion 534. The guideline 560 shown in FIG. 5 as a dashed line delineates the top and bottom portions, and may not be a visible line. A guideline 560 may also be visible to guide the attachment of the label to an article. The top portion 512 is connected to the top portion 532 at a fold line 570. Back surfaces 518 and 538 of the bottom portions 514 and 534, respectively, may be provided with an adhesive to attach the label to an article. Back surfaces 516 and 536 of the top portions 512 and 532, respectively, may be provided with an adhesive to attach the top portions to each other if desired. The separation 550 separates the bottom portion 514 and the bottom portion 534. The separation 550 may be substantially the height of the bottom portion 514 of the first section 510 and/or the bottom portion 534 of the second section 530.

Information may be applied to the front surface of the label 500. Information may be applied to any combination of the top portions, 512 and 532, and the bottom portions 514 and 534. Information may be applied to the back surface, if desired. However, information applied to the back surface may not be visible after the label is attached to an article. As shown in FIG. 5, information may be applied in the same orientation on any portion of the front of the label prior to (and after) folding the label.

Figure 6:
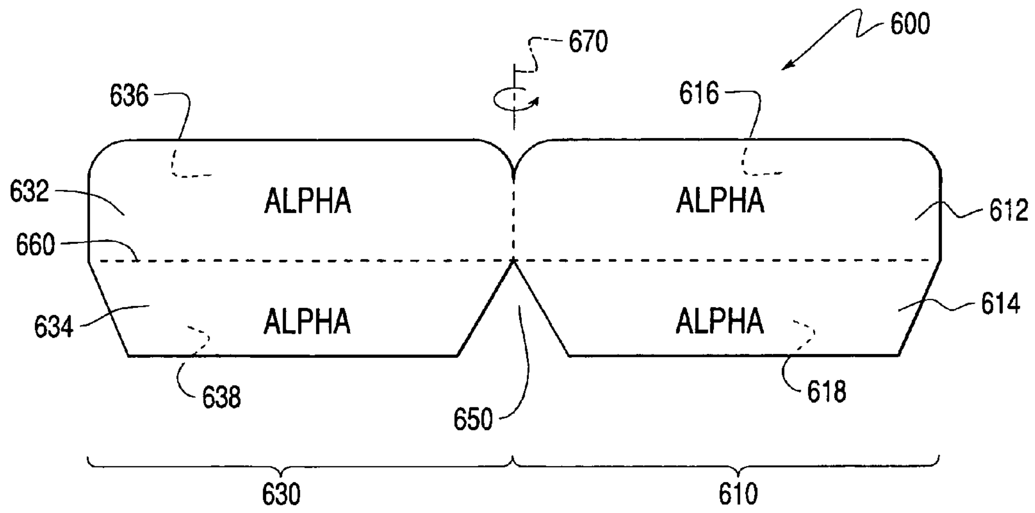
FIG. 6 shows a label according to a second exemplary embodiment.

FIG. 6 illustrates a label 600 according to a second exemplary embodiment. The label 600 may be substantially similar to the label 200 illustrated in FIG. 2 with some modification to its outer shape. The label 600 may include a first section 610, a second section 630 and a separation 650, shown as a triangular shaped notch in FIG. 6. The separation 650 may also be a cut, a slit, a rectangular or an irregular shaped notch, a tear, a torn perforation or any other type of separation. The first section 610 may include a top portion 612 and a bottom portion 614. The second section 630 may include a top portion 632 and a bottom portion 634. The label 600 may also include a guideline 660. The guideline 660 shown in FIG. 6 as a dashed line delineates the top and bottom portions, and may not be a visible line. The guideline 660 may also be visible to guide the attachment of the label to an article. The top portion 612 is connected to the top portion 632 at a fold line 670. Back surfaces 618 and 638 of the bottom portions 614 and 634, respectively, may be provided with an adhesive to attach the label to an article. Back surfaces 616 and 636 of the top portions 612 and 632, respectively, may be provided with an adhesive to attach the top portions to each other if desired. The separation 650 separates the bottom portion 614 and the bottom portion 634. The separation 650 may be substantially the height of the bottom portion 614 of the first section 610 and/or the bottom portion 634 of the second section 630.

Information may be applied to the front surface of the label 600. Information may be applied to any combination of the top portions, 612 and 632, and the bottom portions, 614 and 634. Information may be applied to the back surface, if desired. However, information applied to the back surface may not be visible after the label is attached to an article. As shown in FIG. 6, information may be applied in the same orientation on any portion of the front of the label prior to (and after) folding the label.

Figure 7:
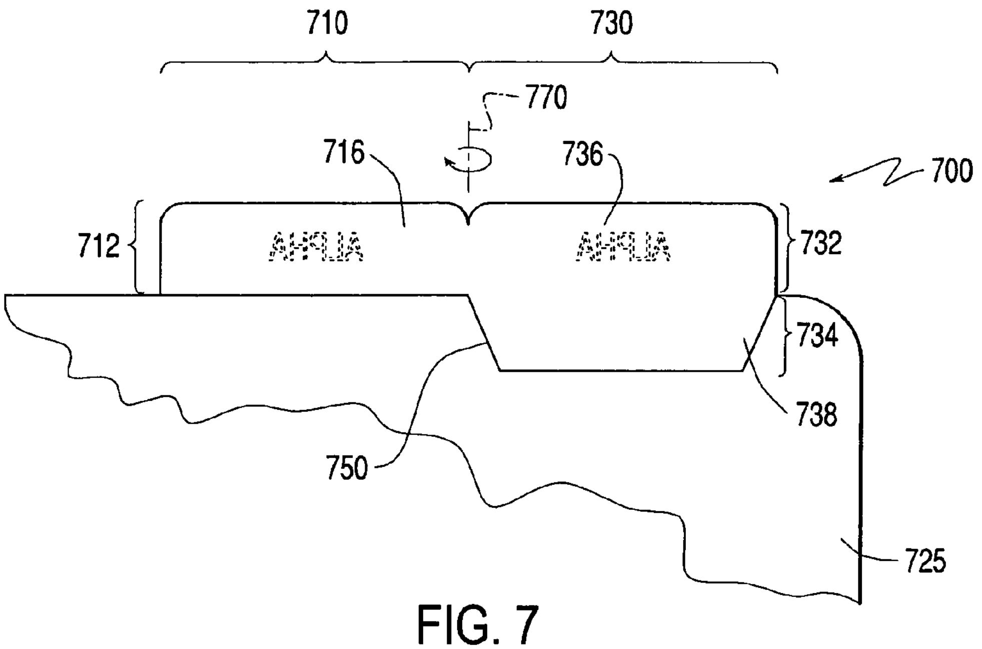
FIG. 7 shows the start of an exemplary method of attaching the label of FIG. 6 to an article.

FIG. 7 illustrates an initial step in an exemplary method of attaching a label 700 to an article 725. The label 700 is substantially the same as label 600 in FIG. 6. The label 700 may include a first section 710, a second section 730 and a separation 750, which is a triangular shaped notch that has only one edge visible in FIG. 7. The separation 750 may also be a cut, a slit, a rectangular or an irregular shaped notch, a tear, a torn perforation or any other type of separation. The first section 710 may include a top portion 712 and a bottom portion (not shown). The second section 730 may include a top portion 732 and a bottom portion 734. The top portion 712 is connected to the top portion 732 at a fold line 770. The back surface of the bottom portion of the first section 710 (not shown) and the back surface 738 of the bottom portion of the second section 730, respectively, are provided with an adhesive to attach the label to the article 725. The back surfaces 716 and 736 of the top portions 712 and 732, respectively, are provided with an adhesive to attach the top portions to each other after being folded to form the protruding part of the label.

The article 725 is slid through the separation 750 of the label 700. As shown in FIG. 7, the back surface 716 of the first section 710 and the back surfaces 736 and 738 of the second section 730 of the label 700 are now visible and face the label maker. The word "ALPHA," which represents identifying information provided on the front surface of each of the top portions 712 and 732 of the label 700, appears in reverse in a half tone. The bottom portion of the first section 710 of label 700 is behind the article 725 and the adhesive may attach the label to the article 725.

Figure 8:
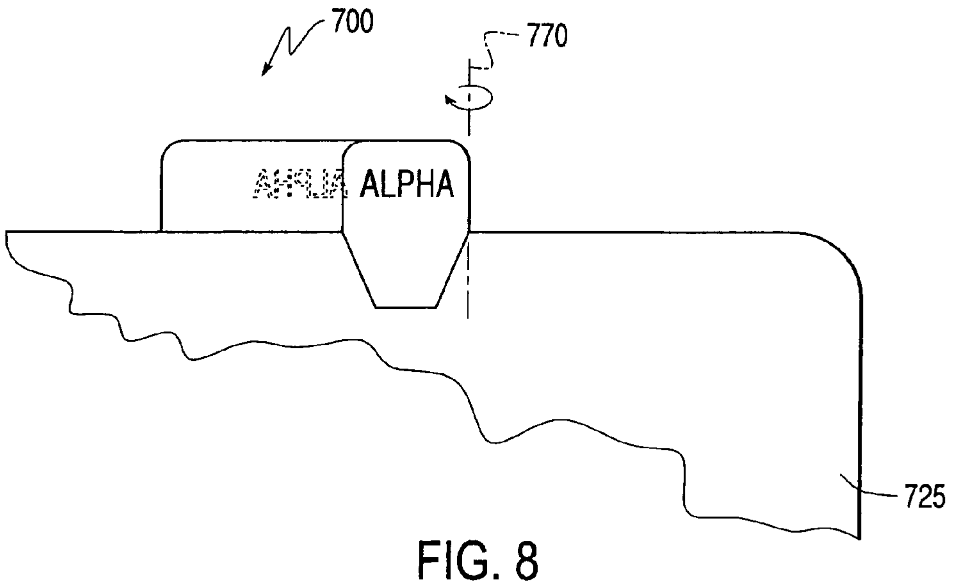
FIG. 8 shows an example of the label of FIG. 6 in the process of being attached to an article.

FIG. 8 illustrates a next step in an exemplary method of attaching the label 700 to article 725. The label 700 is being folded about fold line 770.

Figure 9:
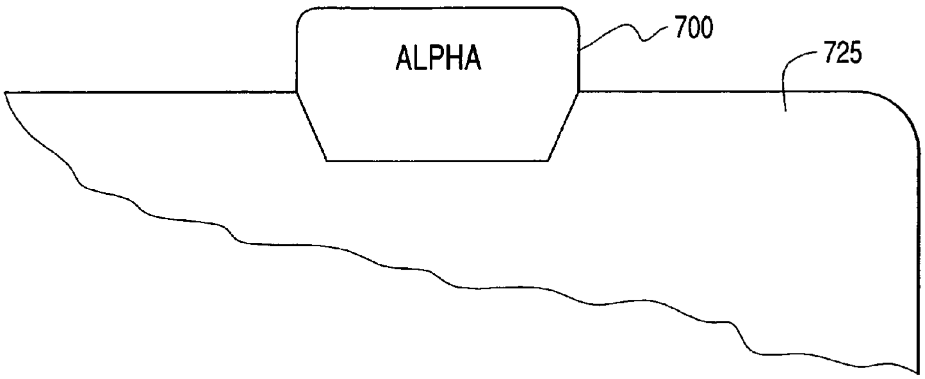
FIG. 9 shows an example of the label in FIG. 6 attached to an article.

FIG. 9 illustrates the label 700 attached to an article 725. The back surfaces of the two sections of label 700 now face each other. The bottom portions attach to each side of the article and the top portions may attach to each other forming the protruding part of the label. The information applied to the label is visible from both sides of the article. As discussed above, the label/information was not rotated 180 degrees when applying the information onto the label.

Figure 10:
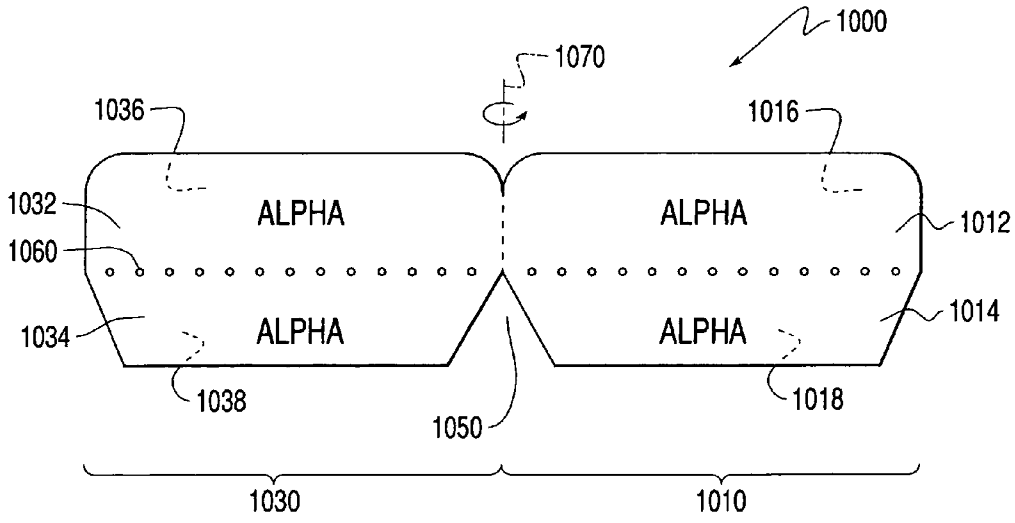
FIG. 10 shows a label according to a modification of the second exemplary embodiment.

FIG. 10 illustrates a label 1000, which is an example of a modification of a label according to the secondary embodiment (label 600 in FIG. 6). The features of the label 1000 can also be applied to the label illustrated in FIG. 2. The label 1000 may include a first section 1010, a second section 1030 and a separation 1050, shown as a triangular shaped notch in FIG. 10. The separation 1050 may also be a cut, a slit, a rectangular or an irregular shaped notch, a tear, a torn perforation or any other type of separation. The first section 1010 may include a top portion 1012 and a bottom portion 1014. The second section 1030 may include a top portion 1032 and a bottom portion 1034. The guideline 1060 shown in FIG. 10 as a dot line represents a perforation. The guideline 1060 delineates the top and bottom portions of label 1000 in FIG. 10. The perforation facilitates the removal of the top portion of the label, for example, after it is attached to an article. The top portion 1012 is connected to the top portion 1032 at a fold line 1070. Back surfaces 1018 and 1038 of the bottom portions 1014 and 1034, respectively, may be provided with an adhesive to attach the label to an article. Back surfaces 1016 and 1036 of the top portions 1012 and 1032, respectively, may be provided with an adhesive to attach the top portions to each other, if desired. The separation 1050 separates the bottom portion 1014 and the bottom portion 1034. The separation 1050 may be substantially the height of the bottom portion 1014 of the first section 1010 and/or the bottom portion 1034 of the second section 1030.

Information may be applied to the front surface of the label 1000. Information may be applied to any combination of the top portions, 1012 and 1032, and the bottom portions, 1014 and 1034. Information may be applied to the back surface, if desired. However, information applied to the back surface may not be visible after the label is attached to an article. As shown in FIG. 10, information may be applied in the same orientation on any portion of the front surface of the label.

Figure 11:
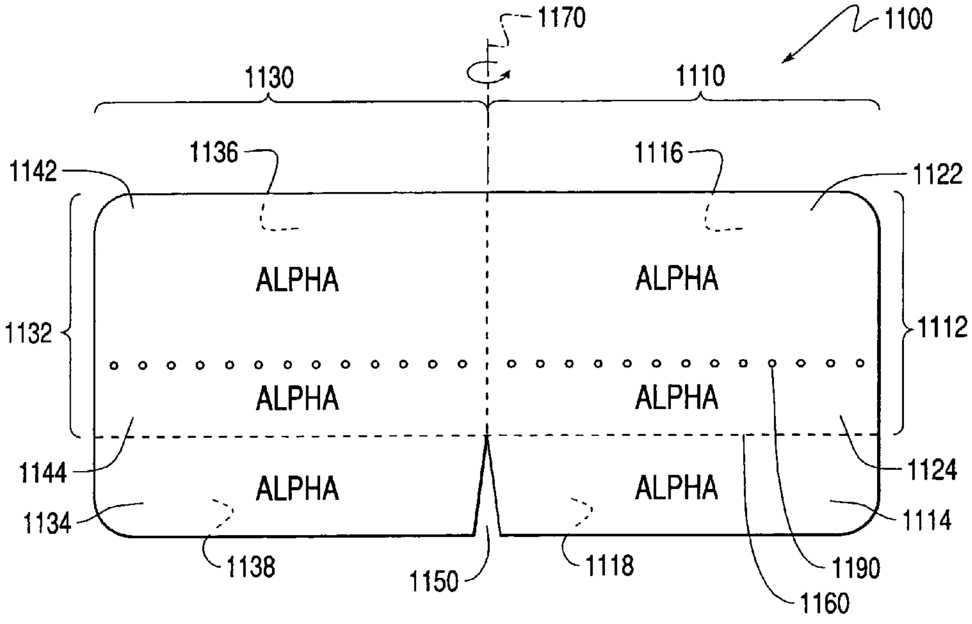
FIG. 11 shows a label according to another modification of the first exemplary embodiment.

FIG. 11 illustrates a label 1100, which is an example of another modification of the first embodiment (label 200 shown in FIG. 2). The features of the label 1100 may also be applied to the label illustrated in FIG. 6. The label 1100 may include a first section 1110, a second section 1130 and a separation 1150, shown as a triangular shaped notch in FIG. 11. The separation 1150 may also be a cut, a slit, a rectangular or an irregular shaped notch, a tear, a torn perforation or any other type of separation. The first section 1110 may include a top portion 1112 and a bottom portion 1114. The second section 1130 may include a top portion 1132 and a bottom portion 1134. The guideline 1160 shown in FIG. 11 as a dashed line delineates the top and bottom portions, and may not be a visible line. The guideline 1160 may also be visible to guide the attachment of the label to an article. The top portion 1112 is connected to the top portion 1132 at a fold line 1170. Back surfaces 1118 and 1138 of the bottom portions 1114 and 1134, respectively, may be provided with an adhesive to attach the label to an article. Back surfaces 1116 and 1136 of the top portions 1112 and 1132, respectively, may be provided with an adhesive to attach the top portions to each other, if desired. The separation 1150 separates the bottom portion 1114 and the bottom portion 1134. The separation 1150 may be substantially the height of the bottom portion 1114 of the first section 1110 and/or the bottom portion 1134 of the second section 1130.

The label 1100 of FIG. 11 also includes a perforated line 1190 that is parallel to the guideline 1160 and is located between the guideline 1160 and the top of the label. The perforated line 1190 divides the top portions 1112 and 1132 of label 1100 into two areas, an upper area 1122 and a lower area 1124, and an upper area 1142 and a lower area 1144, respectively. The perforated line 1190 can facilitate the removal of the top areas 1122 and 1142, for example, after the label is attached to an article, if desired. If the top areas 1122 and 1142 are removed, the lower areas 1124 and 1144 remain with the article and are a protruding part.

Information may be applied to the front surface of the label 1100. Information may be applied to any combination of the top portions, 1112 and 1132, including their respective upper and lower areas, 1122, 1124, 1142 and 1144, and the bottom portions 1114 and 1134. Information may be applied to the back surface, if desired. However, information applied to the back surface may not be visible after the label is attached to an article. As shown in FIG. 11, information may be applied in the same orientation on any part of the front surface of the label.

Figure 12:
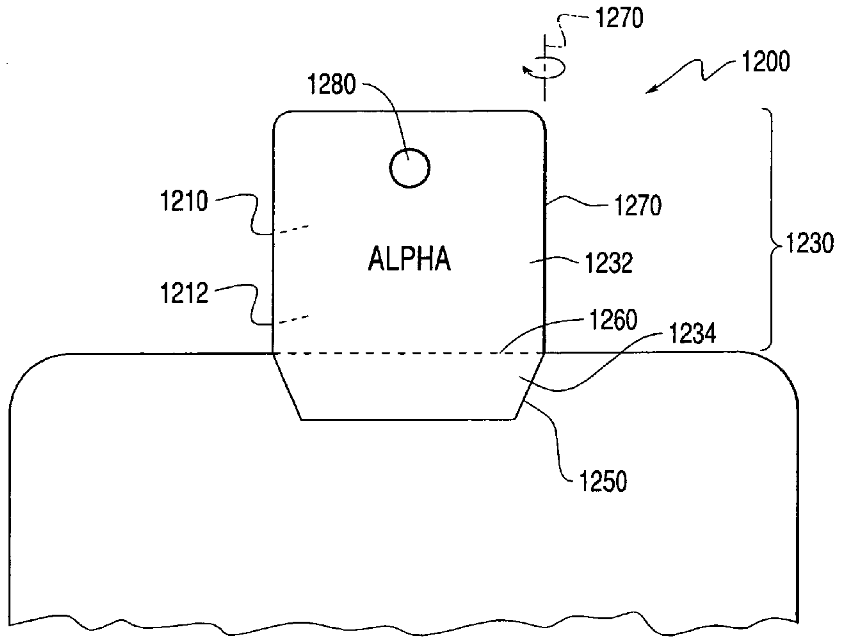
FIG. 12 shows a label according to another modification of the second exemplary embodiment attached to an article.

FIG. 12 illustrates a label 1200 attached to an article. The label 1200 may be substantially similar to labels 200 and 600 illustrated in FIGS. 2 and 6, respectively. The label 1200 may include a first section 1210, a second section 1230 and a separation 1250. The first section 1210 may include a top portion 1212 and a bottom portion (not shown). The second section 1230 may include a top portion 1232 and a bottom portion 1234. The guideline 1260 shown in FIG. 12 as a dashed line delineates the top and bottom portions of label 1100, and may not be a visible line. The guideline 1260 may also be visible to guide the attachment of the label to an article. The top portion 1212 of the first section 1210 is connected to the top portion 1232 of the second section 1230 at a fold line 1270. The separation 1250 may be a cut, a slit, a triangular, rectangular or an irregular shaped notch, a tear, a torn perforation or any other of separation. For example, the separation 1250 shown in FIG. 12 is a triangular shaped notch, which has only one edge visible. The top portions 1212 and 1232 may each include a hole or opening 1280. The hole or opening 1280 allows the article to attach to display, for example, hung from a pegboard.

Figure 13:
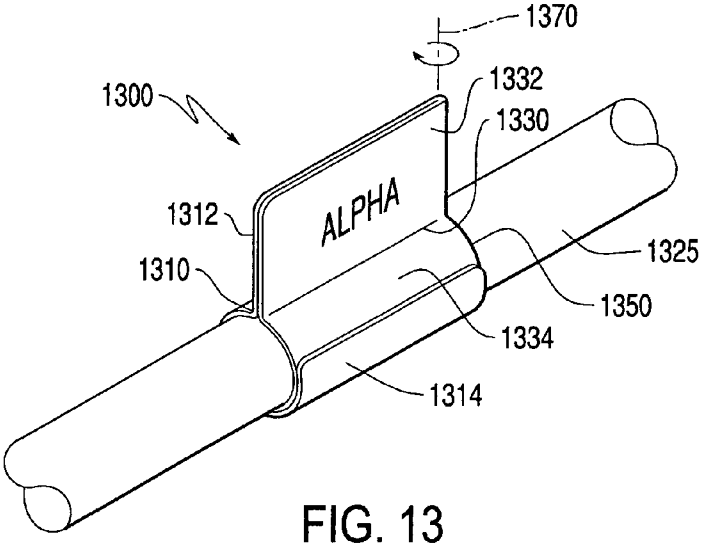
FIG. 13 shows a label according to the first or second exemplary embodiment attached to a cylindrical article.

FIG. 13 illustrates label 1300 attached to a cylindrical article 1325 such as, for example, a tube, cable or wire. The label 1300 may be substantially similar to labels 200 and 600 illustrated in FIGS. 2 and 6, respectively, and their respective modifications, labels 300, 400, 500, 1000 and 1100, illustrated in FIGS. 3, 4, 5, 10, and 11, respectively.

Label 1300 may include a first section 1310, a second section 1330 and a separation 1350. Only one edge of the separation 1350 is visible in FIG. 13. The first section 1310 may include a top portion 1312 and a bottom portion 1314. The second section 1330 may include a top portion 1332 and a bottom portion 1334. FIG. 13 shows the bottom portion 1334 wrapped around a cylindrical article 1325 and the overlapping part of the bottom portion 1314.

Figure 14:
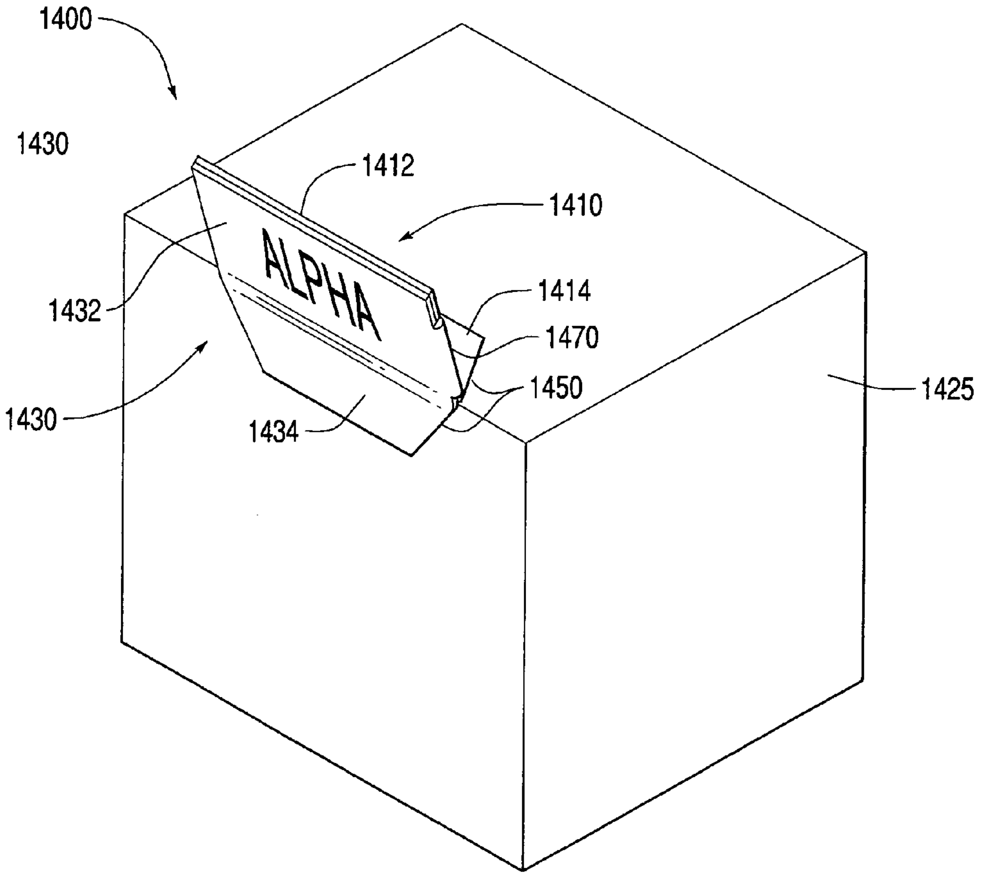
FIG. 14 shows a label according to the first or second exemplary embodiment attached to a cubical article.

FIG. 14 illustrates label 1400 attached to a three-dimensional cubic type article 1425, such as, for example, a box. The label 1400 may be substantially similar to labels 200 and 600 illustrated in FIGS. 2 and 6, respectively, and their respective modifications, labels 300, 400, 500, 1000 and 1100, illustrated in FIGS. 3, 4, 5, 10 and 11, respectively.

The label 1400 may include a first section 1410, a second section 1430 and a separation 1450. Top portions 1412 and 1432 are connected at a fold line 1470 shown as a line in FIG. 14 and form the protruding part of label 1400. The bottom portions 1414 and 1434 are shown attached to the article 1400.

Figure 15:
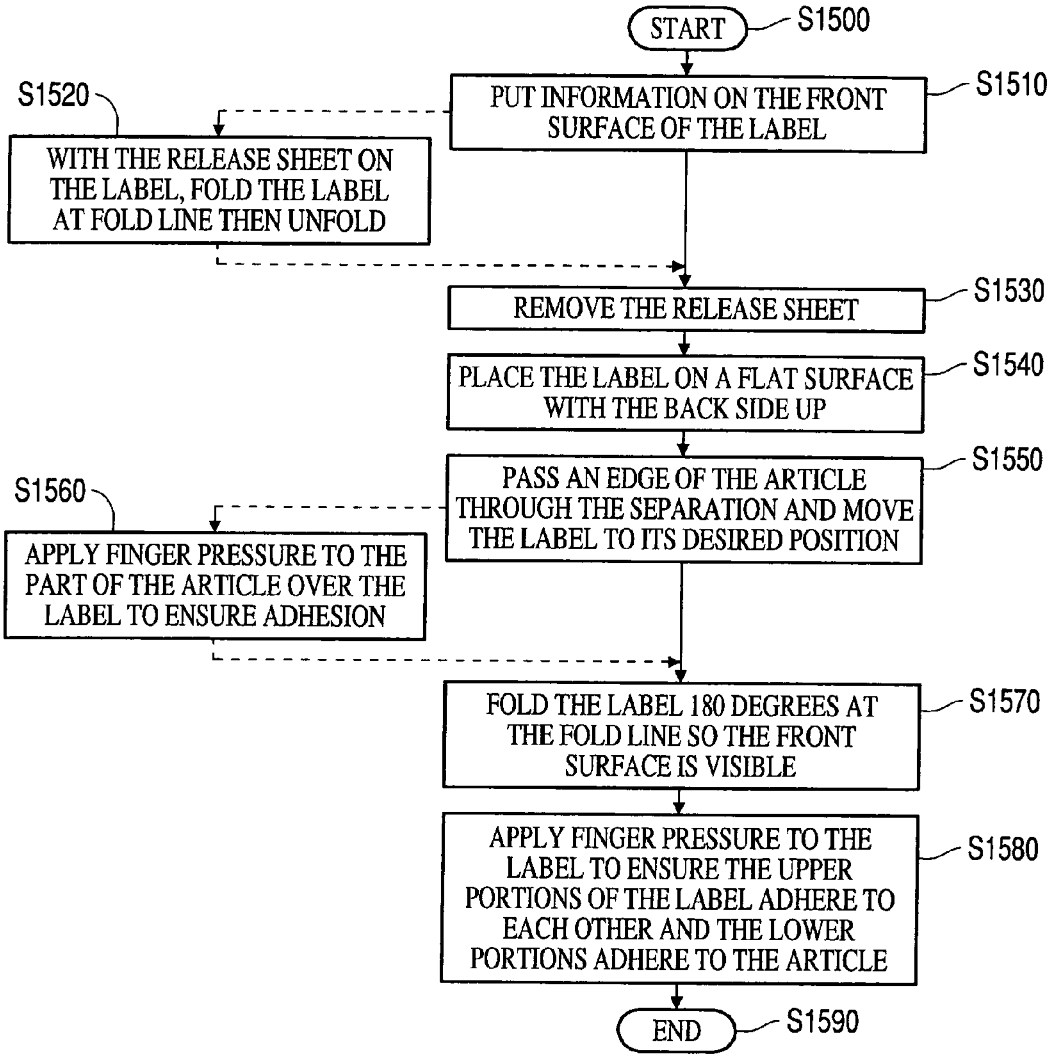
FIG. 15 is a flowchart outlining an exemplary method of attaching a label to an article.

FIG. 15 illustrates a flowchart outlining an exemplary method of attaching a label, such as a label according to any of the above-described embodiments, to an article. The label being attached to an article also may include a pressure sensitive adhesive on its back surface that is attached to a release sheet to protect the adhesive. This method is also not limited to the order of steps described below.

In Step S1510, the information is applied to the front surface of the label, for example, by a printing machine. The information may be applied to both sections of the label, without having to rotate the label or information (e.g., in a software program) 180 degrees so that the information on one section of the label has the same orientation as the information on the other section of the label after the label is attached to an article. In Step S1520, an optional step, the label including the release sheet is folded 180 degrees at the fold line and then unfolded to create a crease at the fold line. However, the folding may occur at any time. By creating the crease before attaching to the article, it is easier to attach the label to an article. However, the label may include a permanent crease that is added, for example, when the label is manufactured. In Step S1530, the release sheet is removed from the label to expose the adhesive on the back surface of the label. In Step S1540, the front surface of the label is placed on a flat surface so that the information on the front surface of the label faces the flat surface, and the back surface of the label is visible. In Step S1550, a label maker begins to attach the label to the article. An edge of the article is passed through the separation of the label such that the back surface of the lower portion of one section of the label faces one side of the article, and the front surface of the lower portion of the other section of the label faces the other side of the article. An example of this step is shown in FIG. 7. The label may then be moved to a desired location on the article. In Step S1560, finger pressure is applied to the area of the article that is over the lower portion of one of the sections of the label. This ensures adhesion of that portion of the label to the article. Step S1560 is not necessary and is added to make the attachment process easier. In Step S1570, the label is folded 180 degrees about the fold line such that the back surfaces of the two upper portions face each other, and the back surfaces of the two lower portions face opposite sides of the article. An example of this folding process is shown in FIG. 8. In Step S1580, finger pressure is applied to the label to ensure the upper portions adhere to each other and the lower portions adhere to the article. The label is now attached to an article. An example of the label attached to the article is shown in FIG. 9.

While exemplary embodiments have been described above, these embodiments should be viewed as illustrative and not limiting. Various modifications, substitutions and/or improvements may be possible within the spirit and scope of the invention.

What is claimed is:

1. A label, comprising:

a front surface;

a back surface;

a fold line, the fold line dividing the label into a first section and a second section; and a guideline, the guideline dividing the first section into a top portion and a bottom portion, and dividing the second section into a top portion and a bottom portion, wherein the fold line and the guideline are perpendicular, wherein the top portion of the first section and the top portion of the second section are connected to each other at the fold line, and wherein the bottom portion of the first section and the bottom portion of the second section are physically divided from each other by a separation at the fold line.

2. The label according to claim 1, wherein at least one of the fold line and the guideline is visible on the front surface of the label.

3. The label according to claim 2, wherein the guideline is a perforated line.

4. The label according to claim 1, wherein at least one of the fold line and the guideline is not visible on the front surface of the label.

5. The label according to claim 1, wherein the separation is between the bottom portion of the first section and the bottom portion of the second section, and wherein the separation is one of a cut, slit, a rectangular shaped notch, a triangular shaped notch, an irregular shaped notch, or a tearable perforation.

6. The label according to claim 5, wherein a distance between the guideline and a bottom edge of the bottom portion of the first section is equal to a distance between the guideline and a bottom edge of the bottom portion of the second section.

7. The label according to claim 6, wherein when the label is folded 180 degrees at the fold line so that the back surface of the first section and the back surface of the second section face each other, a portion of an article is between the bottom portion of the first section and the bottom portion of the second section, and when the bottom portion of the first section and the bottom portion of the second section are attached to the article, the top portion of the first section and the top portion of the second section protrude from the article.

8. The label according to claim 7, wherein at least one of the back surface of the bottom portion of the first section, the back surface of the bottom portion of the second section, the back surface of the top portion of the first section, and the back surface of the top portion of the second section includes an adhesive.

9. The label according to claim 7, wherein the article has a cylindrical, flat or curved surface.

10. The label according to claim 5, wherein a distance between the guideline and a bottom edge of the bottom portion of the first section is different from a distance between the guideline and a bottom edge of the bottom portion of the second section.

11. The label according to claim 5, wherein the label includes information on at least one of the front surface of the top portion of the first section, the front surface of the bottom portion of the first section, the front surface of the top portion of the second section, and the front surface of the bottom portion of the second section that is parallel to the guideline, without rotating an orientation of the information.

12. The label according to claim 11, wherein the label includes information on at least one of the front surface of the top portion the front surface of the bottom portion of the first section, and information on at least one of the front surface of the top portion and the front surface of the bottom portion of the second section that is parallel to the guideline, and wherein when the label is folded 180 degrees at the fold line so the back surface of the first section and the back surface of the second section face each other and the bottom portion of the first section and the bottom surface of the second section attach to the article, an orientation of the information on the first section is identical to an orientation of the information on second section.

13. The label according to claim 5, wherein the label includes at least one perforated line across the first section and the second section, the at least one perforated line being parallel to the guideline, and wherein the at least one perforated line is between the guideline and a top edge of the top portion of the first section and a top edge of the top portion of the second section.

14. The label according to claim 5, wherein the label includes a hole in the top portion of the first section and a corresponding hole in the top portion of the second section.

15. A method for attaching the label of claim 5 to an article, the method comprising:

causing at least a portion of an article to pass through the separation;

folding the label 180 degrees at the fold line so that the back surface of the top portion of the first section and the back surface of the top portion of the second section face each other;

attaching the bottom portion of the first section to the article; and attaching the bottom portion of the second section to the article.

16. The method according to claim 15, wherein when the causing the article to pass through the separation, an edge of the article is parallel to the guideline.

17. The method according to claim 15, further comprising:

attaching the back surface of the top portion of the first section to the back surface of the top portion of the second section.

18. The method according to claim 15, further comprising:

detaching the top portion of the first section and the top portion of the second section from the bottom portions of the first section and the second section.

19. The method according to claim 15, wherein the article has a cylindrical, flat, or curved surface.

20. The method according to claim 15, further comprising:

applying information on at least one of the top portion of the first section, the top portion of the second section, the bottom portion of the first section, and the bottom portion of the second section so as to be parallel to the guideline.

* * * * *